E. M. TRAVIS.
REAR LIGHTING SYSTEM.
APPLICATION FILED MAY 17, 1917.
1,278,794.
Patented Sept. 10, 1918.
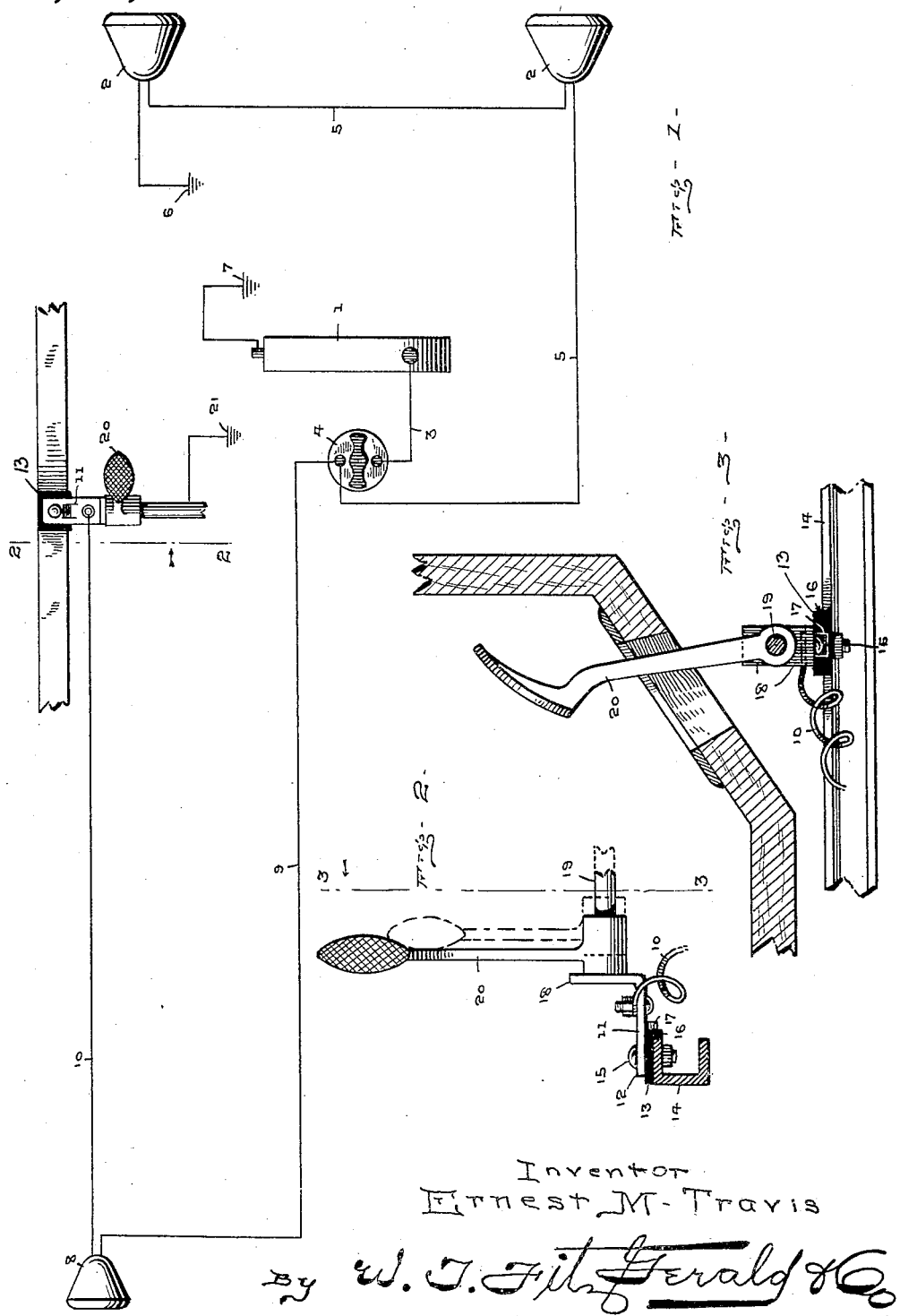
Inventor
Ernest M. Travis
By W. J. FitzGerald & Co.
Attorneys

UNITED STATES PATENT OFFICE.

ERNEST M. TRAVIS, OF SIDNEY, IOWA.

REAR-LIGHTING SYSTEM.

1,278,794.  Specification of Letters Patent.  Patented Sept. 10, 1918.

Application filed May 17, 1917. Serial No. 169,285.

*To all whom it may concern:*

Be it known that I, ERNEST M. TRAVIS, a citizen of the United States, residing at Sidney, in the county of Fremont and State of Iowa, have invented certain new and useful Improvements in Rear-Lighting Systems; and I do hereby declare the following to be a full, clear, and exact description of the invention, such as will enable others skilled in the art to which it appertains to make and use the same.

This invention relates to new and useful improvements in rear lighting systems for motor vehicles, and the primary object of the invention is to provide a rear lamp which will be automatically lighted upon the initial movement of the motor vehicle reverse pedal when it is desired to back the car, the rear lamp providing sufficient light to enable the operator of the vehicle to clearly see far enough in rear of the vehicle to safely back it, the rear lamp being immediately extinguished upon the release of the reverse pedal.

A further object of the invention is to provide a rear lighting system for use in connection with motor vehicles, such as that of the Ford type, and embodies a rear lamp which is connected in circuit between the head light switch and the contact member mounted upon and insulated from the chassis and positioned directly opposite the reverse pedal and its respective supporting shaft, whereby when the head light switch is closed and the reverse pedal initially actuated, its supporting shaft will move laterally into engagement with the contact member and thus complete the electric circuit from the head light circuit through the rear lamp and to a ground through the reverse pedal supporting shaft.

With these and other objects in view as will appear as the description proceeds, the invention comprises the various novel features of construction, combination, and arrangement of parts as will be more fully described hereinafter and set forth with particularity in the appended claim.

Referring to the drawings,

Figure 1 is a diagrammatic view of my improved construction of rear lighting system.

Fig. 2 is a vertical transverse sectional view taken on the line 2—2 of Fig. 1, and Fig. 3 is a vertical section view taken on the line 3—3 of Fig. 2 and showing the adjacent floor boards of the motor vehicle.

Similar characters of reference are used to denote like parts throughout the accompanying drawings and the following description.

The lighting system such as is commonly used in connection with motor vehicles of the Ford type embodies a source of current which is in the form of a magneto arranged within the fly wheel of the engine, this magneto generating sufficient current to light the head lights 2. The current that is generated by the magneto 1 passes through the wire 3 to the head light switch 4, which is usually arranged upon the dash of the motor vehicle, and this switch 4 is in turn connected in series with the head lights 2 through the medium of a wire 5, which is grounded upon the motor vehicle as indicated by the numeral 6. The other terminal of the magneto 1 is grounded as indicated by the numeral 7.

From this construction it will be noted that when the motor is started and the magneto 1 begins to generate current, the current will pass from the magneto through the head light switch 4 and the head lights 2 to the ground 6 thus making a complete circuit through the head lights.

It is in connection with this head lighting system just described that I propose to use my rear light and the means for controlling the lighting and extinguishing of it and to this end the invention consists of a rear light 8, which is adapted to be attached to the rear of the motor vehicle, and which is connected in circuit with the head light switch 4 through the medium of a wire 9. The numeral 10 represents a wire used to connect the rear lamp 8 to a suitable angle iron contact member 11. The horizontal arm 12 of the angle iron contact member is mounted upon a piece of insulation 13 that is arranged upon and secured to the chassis frame 14 through the medium of a bolt or other securing means 15. This piece of insulation 13 is provided with a depending flange 16 that overlies the inner edge of the chassis frame.

In order to prevent casual movement of the arm 12, a tongue 17 is stamped from it and depends in overlapping relation against the flange 16 of the insulating strip 13.

The other arm 18 of the angle iron contact member 11 is disposed vertically and at right angles to the arm 12, and said contact member 11 is positioned directly opposite the outer end of the reverse shaft 19 upon which is mounted the reverse pedal 20.

In the operation of the device, and assuming that the head light switch 4 is closed the reverse pedal 20 is actuated, and immediately upon the initial movement of the reverse pedal 20, the shaft 19 carrying the pedal will move laterally into contact with the vertical arm 18 of the contact member 11, thus completing the circuit from the magneto through the head light switch 4, rear lamp 8, contact member 11, reverse pedal 20 and the reverse shaft 19 to the ground as indicated by the numeral 21. It is of course to be understood that the circuit through the lamp 8 will be completed just as soon as the reverse pedal begins to move forwardly, and upon the release of the pedal 20 the circuit through the lamp will be broken and the lamp extinguished. It is of course to be understood that in order to accomplish the above described operation between the reverse pedal and the arm 18, that the latter must be resilient enough to permit of it flexing slightly under the lateral thrust of the reverse pedal and the reverse shaft against it.

When it is desired to dispense with the use of the lamp 8 the head light switch 4 is opened so that when the reverse pedal 20 is actuated no current will flow through the lamp, as well as through the head lights 2.

I desire to have it understood that while I have primarily designed my rear lighting system for use in connection with motor vehicles of the Ford type, that by a slight change in arrangement and construction of parts, it may be applied to various other types of motor vehicles.

I claim:

In a motor vehicle, the combination of the laterally movable reverse shaft, a source of current grounded on the vehicle chassis, a switch in circuit with said source of current, a piece of insulation mounted on the chassis in transverse alinement with said reverse shaft, a resilient right angular contact member having one end mounted on said piece of insulation and the other end projecting upwardly in the path of movement of said reverse shaft, securing means passing through said resilient contact member, piece of insulation and chassis, and a rear lamp connected in circuit with said switch and resilient contact member, said reverse shaft adapted upon its initial lateral movement to move into engagement with the upstanding end of said resilient contact member and complete the circuit through said lamp, resilient contact member and reverse shaft to the ground.

In testimony whereof I have signed my name to this specification in the presence of two subscribing witnesses.

ERNEST M. TRAVIS.

Witnesses:
S. F. HANSON,
LEONARD TRAVIS.